(12) United States Patent
Matsuoka et al.

(10) Patent No.: US 6,972,681 B2
(45) Date of Patent: Dec. 6, 2005

(54) MONITORING APPARATUS

(75) Inventors: Yoshiaki Matsuoka, Hitachinaka (JP); Mitsuru Terakado, Hitachinaka (JP); Kouji Nosato, Hitachinaka (JP); Takao Sukegawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 10/767,198

(22) Filed: Jan. 30, 2004

(65) Prior Publication Data

US 2004/0257217 A1    Dec. 23, 2004

(30) Foreign Application Priority Data

Mar. 3, 2003    (JP) .............................. 2003-055340

(51) Int. Cl.[7] ............................................. G08B 13/00
(52) U.S. Cl. ......................... 340/541; 340/507; 714/48
(58) Field of Search ............................... 340/541, 507, 340/3.1, 3.43, 3.7; 700/95; 714/47, 48, 100

(56) References Cited

U.S. PATENT DOCUMENTS 5,414,632 A * 5/1995 Mochizuki et al. ......... 700/174

6,023,774 A * 2/2000 Minagawa .................... 714/43
6,879,867 B2 * 4/2005 Tanaka et al. ............... 700/108
6,907,388 B2 * 6/2005 Suzuki et al. ................ 702/188

FOREIGN PATENT DOCUMENTS

JP    5-231884    9/1993    .......... G01D 21/00
JP    2000-231780    8/2000    .......... G11B 33/10

* cited by examiner

Primary Examiner—Toan N. Pham
(74) Attorney, Agent, or Firm—Antonelli, Terry, Stout and Kraus, LLP.

(57) ABSTRACT

An monitoring apparatus, when detecting an abnormality in objects to be monitored by the monitoring apparatus or an abnormal state in the monitoring apparatus, which indicates the location or contents of the abnormality or abnormal state and also indicates a method for coping with it by sound or by OSD. When an administrator pushes a security-navi button, abnormality information in the objects to be monitored and a method for coping with it are displayed as a menu on the OSD. When the administrator operates the monitoring apparatus according to the displayed menu, the cause of the abnormality and a method for overcoming it can be provided.

10 Claims, 12 Drawing Sheets

MONITORING APPARATUS

BACKGROUND OF THE INVENTION

The present invention relates to a monitoring apparatus such as a crime prevention monitoring apparatus and more particular, to a technique for improving the operability of the apparatus.

Monitoring apparatuses are divided according to applications into crime prevention apparatuses intended to prevent crime and state monitoring apparatuses for monitoring states of various sorts of devices or of sections in manufacturing facilities such as plants. In either case, such two types of apparatuses have been widely used in our society. The crime prevention monitoring apparatuses are increasingly used mainly in financial institutions such as banks, in stores or shops such as convenient stores or in buildings or condominiums managed by various sorts of business organizations. The state monitoring apparatuses for monitoring the activity states of devices or organizations are also widely use in various sorts of plants or factories.

Since such a monitoring apparatus is required to be capable of coping with an unexpected event, the apparatus is generally used often continuously for a long period of time. For such an application reason, the monitoring apparatus tends to develop wear and tear. In this connection, there is an apparatus for detecting the state of the interior of a video recorder for use in the monitoring apparatus and displaying an alarm. In this apparatus, a method is devised which reproduces the tape used in a magnetic recording/reproducing device, detects a video missing signal, judges the deterioration of the tape, and displays an alarm to inform a user of the tape exchange timing. For example, refer to JP-A-2000-231780.

A monitoring apparatus for plant application collects plant data from various devices in the plants, writes the data in a current state value table, compares contents of the current state value table with contents of an alarm limit table, issues an alarm, and in response to a request from an operator, outputs a screen number corresponding to the alarm. For example, refer to JP-A-5-231884.

SUMMARY OF THE INVENTION

In JP-A-2000-231780, the tape deterioration of the magnetic recording/reproducing device is judged, the tape exchange timing is displayed or alarmed. However, only the tape exchange timing is alarmed, no consideration is paid to associated items except for the exchange timing. The apparatus fails to inform the user of information associated with the tape exchange timing, for example, information, such as whether the cause of the tape deterioration is attributable to mere frequent use of the tape or to the use of an improper type of tape.

In JP-A-5-231884, an alarm is displayed on the display unit of the monitoring apparatus. When the operator issues a request to the monitoring apparatus, the apparatus can only output the screen number associated with the alarm. In other words, the monitoring apparatus cannot monitor different several types of objects, nor detect different types of abnormal states, nor output information associated with different types of data or solution information coping with the abnormal states.

It is therefore an object of the present invention to provide a monitoring apparatus which monitors different sorts of objects and, when detecting an abnormality in the objects to be monitored, displays suitable solving methods for each different object to be monitored in response to user's operation of an operating section of the apparatus, whereby the user can smoothly cope with the abnormality.

In accordance with an aspect of the present invention, the above object is attained by providing a monitoring apparatus for monitoring monitor information sent from objects to be monitored. The monitoring apparatus includes a means for operating the monitoring apparatus, a means for detecting abnormalities including a fault in the monitor information sent from the objects to be monitored, and a means for notifying of the abnormality in the objects to be monitored detected by the abnormality detecting means in the form of sound, light or OSD (On Screen Display). When the operating means is operated after the notification by the notifying means, associated information of the monitor information about the object to be notified is displayed on the OSD or by another means.

The present invention preferably further includes a means for previously storing associated information about monitor information and a means for selecting the associated information displayed on the display means. The associated information includes an item for stopping the notification made by the notification means so that when the item for stopping the notification is selected by the selecting means, the notification is stopped and information about the reason of the notification and its coping or resolving method are displayed.

In the present invention, preferably, further, a plurality of objects to be monitored are provided outside and inside of the monitoring apparatus, wherein the objects to be monitored present inside of the monitoring apparatus are the states of respective units or sections that are present in the apparatus, and the monitor information sent from the plurality of objects to be monitored include identification information (e.g., indicative of a faulty location) indicative of which monitor information is sent from which one of the objects to be monitored.

In the present invention, preferably, furthermore, a video signal is used as the monitor information sent from the objects to be monitored.

The present invention preferably also includes a means for notifying an abnormality of a monitor information detected by the means for detecting the abnormality in the monitor information sent from a plurality of external devices, so that, when the abnormality is notified by the notifying means, the operating means such as an operating button of the abnormality notifying means may be operated after the notification of the abnormality notifying means to thereby stop the notification.

The present invention preferably also includes a means for notifying an abnormality or fault in the states of internal units or sections of the monitoring apparatus detected by the means for detecting an abnormality or fault in the states of internal units or sections of the apparatus, so that the operating means may be operated after the notification of the abnormality notifying means to display information (e.g., the cause of the fault) associated with the abnormality or fault.

Other objects, features and advantages of the invention will become apparent from the following description of the embodiments of the invention taken in conjunction with the accompanying drawings.

DESCRIPTION OF THE EMBODIMENTS

Figure 1:
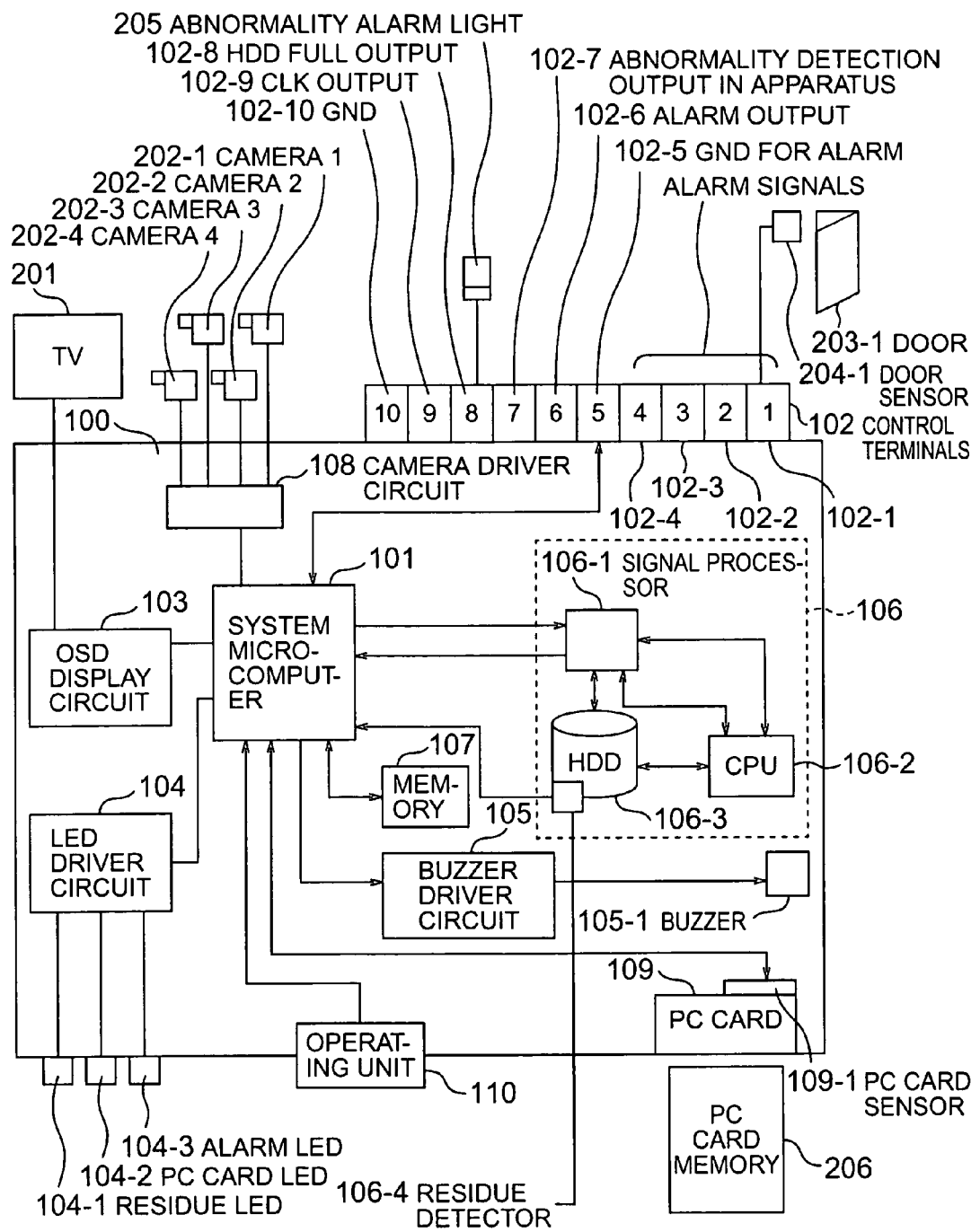
FIG. 1 is an arrangement of an apparatus having a security navigation mounted therein in accordance with an embodiment of the present invention.

FIG. 1 shows a block diagram of a schematic configuration of an monitoring apparatus in accordance with an embodiment of the present invention. Explanation will be made as to the configuration of the apparatus by referring to FIG. 1. Reference numeral 100 denotes a monitoring apparatus which acquires monitor information from objects to be monitored outside and inside of the monitoring apparatus and displays on a display unit an abnormality in the objects and a method for coping with the abnormality to inform an administrator of the fact. Reference numeral 101 denotes an system microcomputer for controlling the entire monitoring apparatus, and numeral 102 denotes control terminals through which monitor information on external devices are sent to the system microcomputer 101.

In the illustrated embodiment, 10 control terminals are provided. Alarm signals from 4 door sensors 204-1 to 204-4 are sent to the control terminals 102-1 to 102-4. More specifically, an alarm 1 signal is sent from the door sensor 204-1 to the control terminal 102-1, an alarm 2 signal is sent from the door sensor 204-2 to the control terminal 102-2, an alarm 3 signal is sent from the door sensor 204-3 to the control terminal 102-3, and an alarm 4 signal is sent from the door sensor 204-4 to the control terminal 102-4. The control terminal 102-5 is grounded (GND) for the alarm signals, the control terminal 102-6 is used to externally output an alarm when the alarm signal is input to the system microcomputer 101. The control terminal 102-7 is used to output an internal abnormality detected in the apparatus, and the control terminal 102-8 is used to externally output a signal indicative of hard disk full when a residue in the recordable capacity of a hard disk recorder provided within the system microcomputer 101 reaches a constant level or less. The control terminal 102-9 is used to output a clock (CLK) for time adjustment of the external devices, and the control terminal 102-10 is ground (GND).

Reference numeral 103 denotes an OSD (On Screen Display) circuit which displays a character or video on a monitor such as a television, numeral 104 denotes an LED driver circuit for lighting an alarm display LED provided on the front panel of the monitoring apparatus 100, 104-1 denotes an residue LED indicative that the residue in the recording capacity of the hard disk recorder is small when the LED is lighted, 104-2 denotes a PC card LED indicative that the PC card is mounted when the LED is lighted, 104-3 denotes an alarm LED indicating that at least any of the signals of the alarm 1 signal to the alarm 4 signal is input when the LED is lighted, 105-1 denotes a buzzer for announcing of an abnormality in the objects to be monitored or in the monitoring apparatus 100 in the form of sound, and 105 denotes a buzzer driver circuit for driving the buzzer 105-1. Reference numeral 105 denotes a hard disk recorder which records or reproduces a video signal or the like of the objects to be monitored, and has a signal processor 106-1, a CPU (Central Processing Unit) 106-2, a hard disk drive (which will be referred to as the HDD, hereinafter) 106-3 which contains a recording medium, and a residue detector 106-4 for detecting a residue in the capacity of the HDD. Numeral 107 denotes a memory for storing therein contents of abnormality display and methods for coping with abnormalities when the abnormalities take place in the objects to be monitored inside and outside of the monitoring apparatus 100. Numeral 108 denotes a camera driving circuit for driving an external camera. Numeral 109 denotes a PC card slot in which the PC card memory is to be inserted, in which case various sorts of information can be recorded in and read out from the PC card memory. Numeral 109-1 denotes a PC card sensor for detecting the presence of the PC card inserted, and 110 denotes an operating unit through which a user operates the monitoring apparatus 100. Connected to the monitoring apparatus 100 are external devices, such as a television set (which will be referred to as the TV, hereinafter) 201 and four cameras 202-1 to 202-4 (also referred to merely as cameras 1, 2, 3 and 4 respectively). The TV 201 is used to display a video image of an object to be monitored, an alarm display and so on.

The external devices further include doors 203-1 to 203-4 to which door sensors 204-1 to 204-4 are mounted respectively, so that alarm signals from the four door sensors 204-1 to 204-4 are connected to the monitoring apparatus 100 via the control terminal 102-1 to 102-4. In this connection, the doors 203-2 to 203-4 and the door sensors 204-2 to 204-4 mounted on the doors are not shown in FIG. 1. The external devices further include an abnormality alarm light 205 which is connected to the monitoring apparatus 100 via the control terminal 102-8 to be lighted when the residue in the recording capacity of the hard disk recorder 106 becomes less.

The external devices also include a PC card memory 206 which can record video information about the objects to be monitored and other monitor information.

Figure 2:
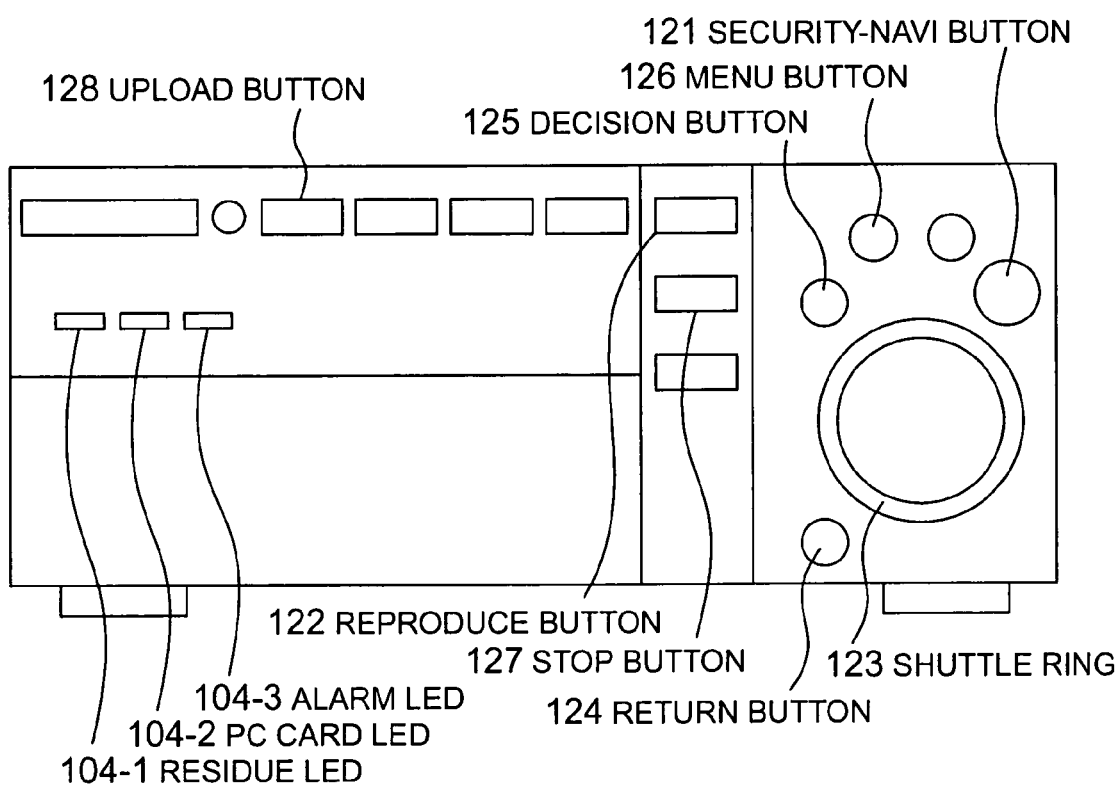
FIG. 2 shows operating buttons of the security navigation mounted apparatus.

FIG. 2 shows a front view of the monitoring apparatus in accordance with the embodiment of the present invention. With reference to FIG. 2, explanation will be made as to the operations of main operating buttons provided on the monitoring apparatus 100. Reference numeral 121 denotes a security navigation button (abbreviated to security-navi button, hereinafter). When the buzzer 105-1 or the like informs the administrator of an abnormality in the objects to be monitored or an abnormality in the monitoring apparatus and when the administrator operates the security-navi button 121, a method for coping with the abnormality is displayed on the TV 201. A shuttle ring 123 is used to select a menu indicative of the coping method, etc. for the abnormality. Numeral 124 denotes a return button and 125 denotes a decision button for menu operation. Both the return button 124 and decision button 125 are buttons for operating the menu. Numeral 126 denotes a menu button. When the administrator operates the menu button 126, a basic menu is displayed.

Next, explanation will be made in detail as to how the administrator operates the security-navi button 121 to cope with an abnormality in connection with several examples wherein, when an abnormality in objects to be monitored or in monitoring devices is indicated to an administrator by the sounding of the buzzer 105-1, by the alarm display of the LEDs 104-1 to 104-3, or by the alarm display on the TV 201.

Explanation will first be made in connection with an embodiment of the present invention when an alarm signal is input to the monitoring apparatus 100 from a door sensor, with reference to FIG. 1.

The alarm 1 signal is connected to the door sensor 204-1. When the door is closed, the door sensor is grounded and outputs an alarm signal of a low (L) level. When the door is opened, the door sensor is open-circuited and outputs an alarm signal of a high (H) level. When a dubious person opens the door 203-1, the alarm signal of H level from the door sensor 204-1 is input to the monitoring apparatus 100 via the control terminal 102-1. The once-input alarm signal will be continuously maintained even after the dubious person closes the door.

The alarm 1 signal input from the control terminal 102-1 is input to the system microcomputer 101. Now, the system microcomputer 101 in turn identifies the alarm 1 signal as the alarm 1 signal received via the control terminal 102-1, judges the input signal as having a high (H) level, and causes the buzzer driver circuit 105 to generate a start signal to sound the buzzer 105-1. The system microcomputer 101 then causes the LED driver circuit 104 to generate a control signal to light the alarm LED 104-3, and further instructs the OSD display circuit 103 to generate a signal to display "alarm input present" on the display screen of the TV 201. In this connection, the identification of the alarm signal may be done by the terminal number of the control terminal 102 connected to the system microcomputer 101 or the timing of the alarm signal relative to a reference signal.

At this time, the administrator in a management room notices the generation of an abnormality when listening to a buzzer sound from the monitoring apparatus and tries to put out the sound. There are two methods of putting out the buzzer sound, that is, a method of using the menu button 126 and the other method of using the security-navi button 121, which will now be explained.

Figure 3:
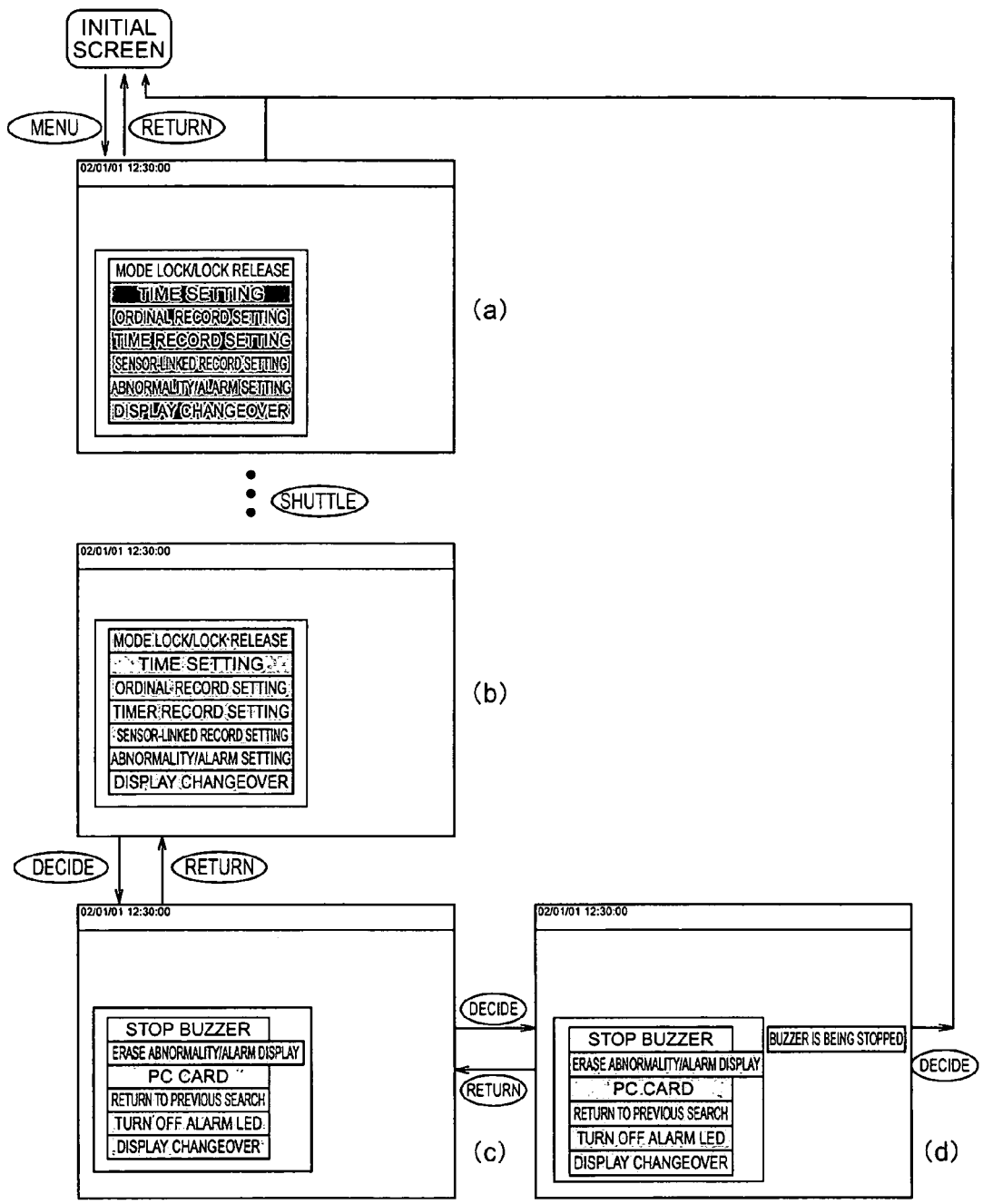
FIG. 3 is an example of an OSD display screen showing a coping method when an external abnormality takes place in the security navigation mounted apparatus of the embodiment of the present invention.

The operating method using the menu button 126 will first be explained by referring to FIG. 3. When the administrator pushes the menu button 126, such a basic menu as shown in FIG. 3(*a*) appears on the screen of the TV 201. When the administrator turns the shuttle ring 123 and moves the cursor as far as an abnormality/alarm setting, such a screen as shown in FIG. 3(*b*) appears on the TV screen. When the administrator now pushes the decision button 125, such a display as shown in FIG. 3(*c*) appears. When the administrator pushes the decision button 125 with the cursor stopped on the highlighted "buzzer stop", such a display as shown in FIG. 3(*d*) appears, showing a message of "the buzzer will be stopped". At this time, when the administrator pushes the decision button 125, the buzzer sound is stopped.

Figure 4:
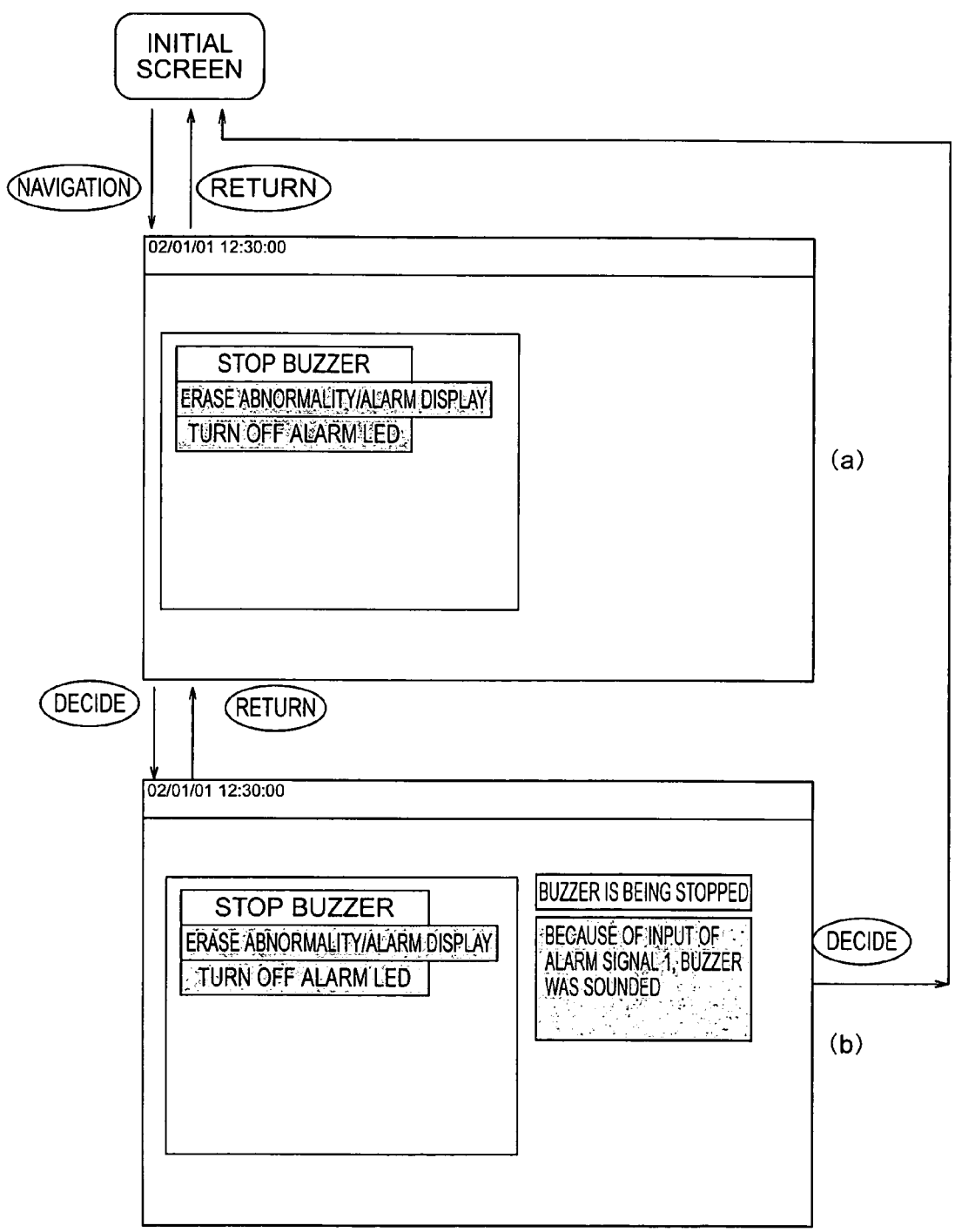
FIG. 4 is another example of the OSD display screen showing a coping method when an external abnormality takes place in the security navigation mounted apparatus of the embodiment of the present invention.

The second method of using the security-navi button 121 will next be explained by referring to FIG. 4. In this method, the administrator first pushes the security-navi button 121 when noticing the buzzer sound. This causes a display of FIG. 4(*a*) to appear on the TV 201. In the display of FIG. 4(*a*), three choices of "stop buzzer", "erase abnormality/alarm display" and "turn off alarm LED" associated with the contents of the current alarm state appear. Since the administrator now wants to put out the buzzer sound, he selects the "stop buzzer" and pushes the decision button 125. This causes such a display as shown in FIG. 4(*b*) to appear on the display screen, showing two messages; "buzzer is being stopped" which is a piece of processing information and "because of input of the alarm signal 1, buzzer was sounded" showing the cause. On the basis of such messages, the administrator pushes the decision button 125 to stop the buzzer sound, and he immediately can confirm a camera video around the door sensor 204-1 emitted the alarm 1 signal on the TV 201, or can go to the camera site and confirm the current state.

As has been explained above, the method of using the security-navi button 121 can cope with the abnormality more quickly than the method of using the menu button 126.

Figure 5:
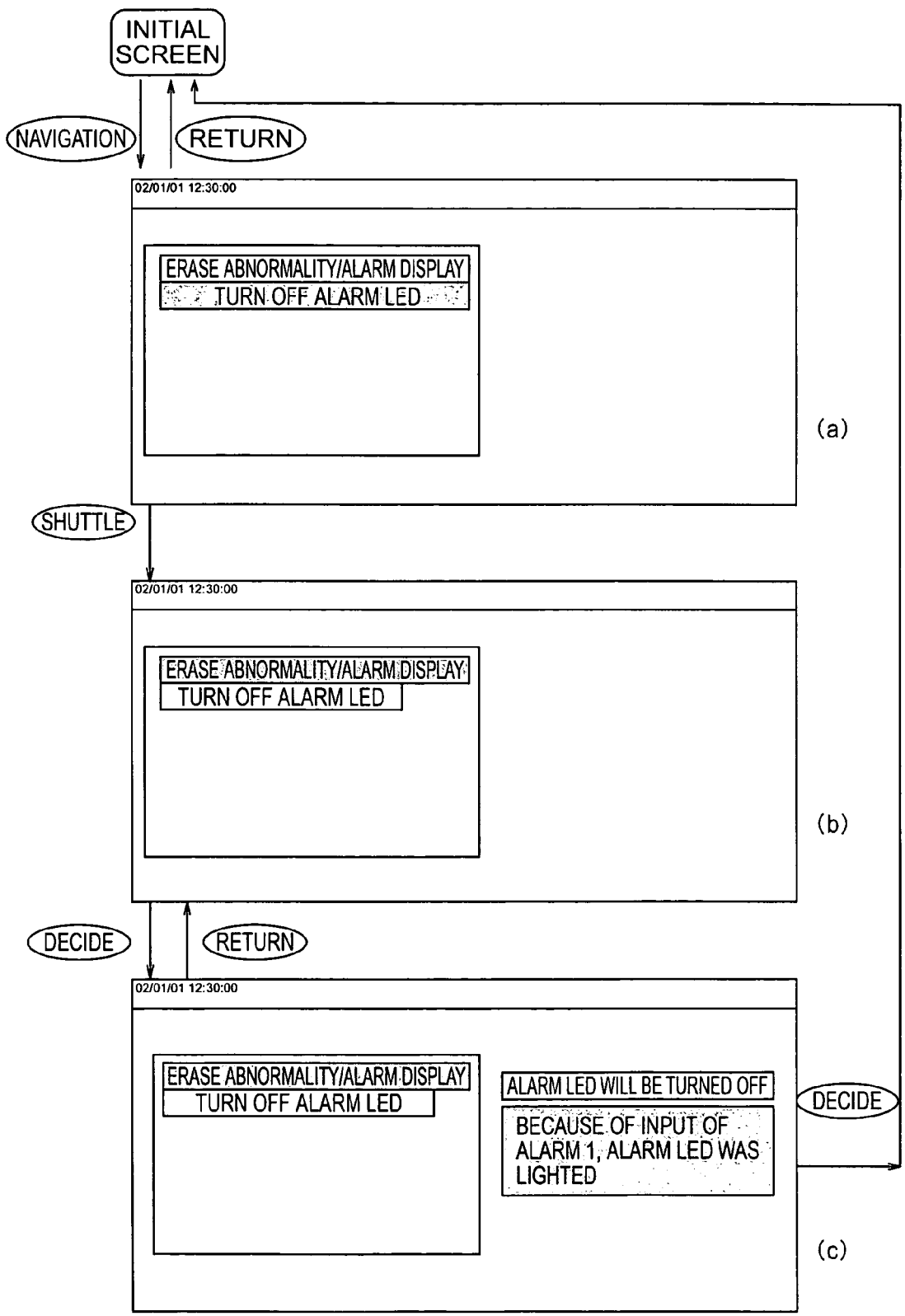
FIG. 5 is another example of the OSD display screen showing a coping method when an external abnormality takes place in the security navigation mounted apparatus of the embodiment of the present invention.

Subsequently, explanation will be made of a case of using the security-navi button 121 to turn off the alarm LED 104-3. The administrator pushes the security-navi button 121. This causes the display of FIG. 5(*a*) to appear on the display screen of the TV 201. Because the buzzer is stopped already at the current stage, the item of "stop buzzer" in FIG. 4(*a*) will not appear this time. That is, only the item of alarming the current abnormality appears on the display screen. Since the administrator wants to turn off the alarm LED 104-3 this time, he operates the shuttle ring 123 and selects the "turn off alarm LED". This causes such a display as shown in FIG. 5(*b*) to appear on the display screen. When the administrator now pushes the decision button 125, the display of the FIG. 5(*c*) appears, showing two messages; "alarm LED is being turned off" which is a piece of processing information and "because alarm 1 was operated, alarm LED was lighted" showing the cause. On the basis of such messages, the administrator can push the decision button 125 and turn off the alarm LED 104-3.

Further, the display of "alarm input present" on the display screen of the TV 201 can be put out by the administrator who similarly selects "put out abnormality/alarm display" and pushes the decision button 125.

In accordance with the aforementioned embodiment, when an abnormality takes place, only the item of alarming the current abnormality is displayed on the TV 201. For this reason, even a person who is not accustomed to the monitoring apparatus can remove the abnormality only by pushing the security-navi button 121, which is highly convenient. Although the operation of the turning off of the alarm LED and the operation of the putting out of the abnormality/alarm display of the TV 201 have been carried out separately in the illustrated example, the two operations may be carried out simultaneously by either one of the operations.

Figure 6:
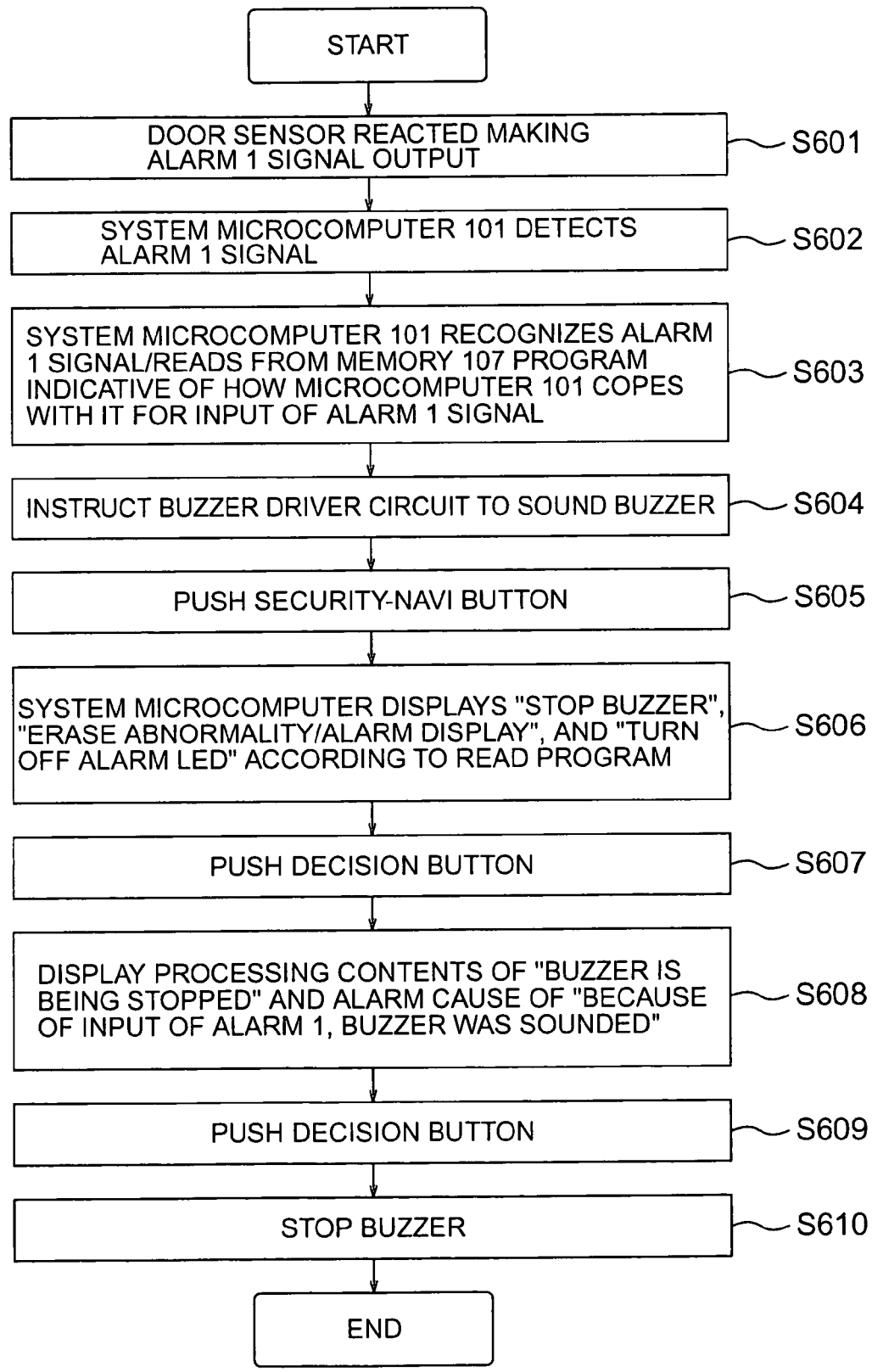
FIG. 6 is a flow chart of operations of a microcomputer in the security navigation mounted apparatus of the embodiment of the invention.

The above explanation has been made mainly from the viewpoint of the operational procedure. Detailed explanation will next be directed to operations after the door sensor 204-1 is operated to sound the buzzer 105-1 until the administrator operates the security-navi button 121 to stop the buzzer, by referring to a flow chart shown in FIG. 6.

When the door 203-1 is opened, the door sensor 204-1 detects the fact that the door 203-1 was opened, and outputs the alarm 1 signal (step S601). The alarm 1 signal is sent via the control terminal 102-1 to the system microcomputer 101, which in turn detects the alarm 1 signal sent therefrom (step S602). The system microcomputer 101 recognizes the alarm 1 signal and reads out a program indicating how the system microcomputer 101 copes with the alarm 1 signal when receiving the alarm signal, from the memory 107 (step S603). The system microcomputer 101 instructs the buzzer driver circuit 105 to sound the buzzer 105-1 (step S604).

When noticing the buzzer sound, the administrator pushes the security-navi button 121 (step S605). This causes the system microcomputer 101 to display the items of "stop buzzer", "erase abnormality/alarm display" and "turn off alarm LED" under control of the read program (step S606). When the administrator pushes the decision button 125 (step S607), the message of "buzzer is being stopped" as the processing contents as well as the message of "because the alarm signal processor 106-1 was input, the buzzer was sounded" as the alarm cause are displayed (step S608). Next, when the administrator pushes the decision button 125 (step S609), the buzzer is stopped (step S610).

Explanation will then be made as to an abnormal display when the monitoring apparatus fails to detect a video signal from the camera 202-1 picking up an image of an object to be monitored and as to how to handle the abnormality.

The monitoring apparatus 100 includes the hard disk recorder 106 which can record a video sent from the external four cameras 202-1 to 202-4. A video signal from the cameras is input to the camera driving circuit 108. When the cable of the camera 202-1 is disconnected or becomes faulty and when the video signal is interrupted for some reason or other, the camera driver circuit 108 determines the presence or absence of the video signal and inputs information about from which camera the video signal is not detected to the system microcomputer 101. In this case, the system microcomputer 101 causes the OSD display circuit 103 to generate a control signal for displaying a message of "camera input lost" on the display screen of the TV 201, and further causes the buzzer circuit 105 to output a signal to drive and sound the buzzer 105-1.

Figure 7:
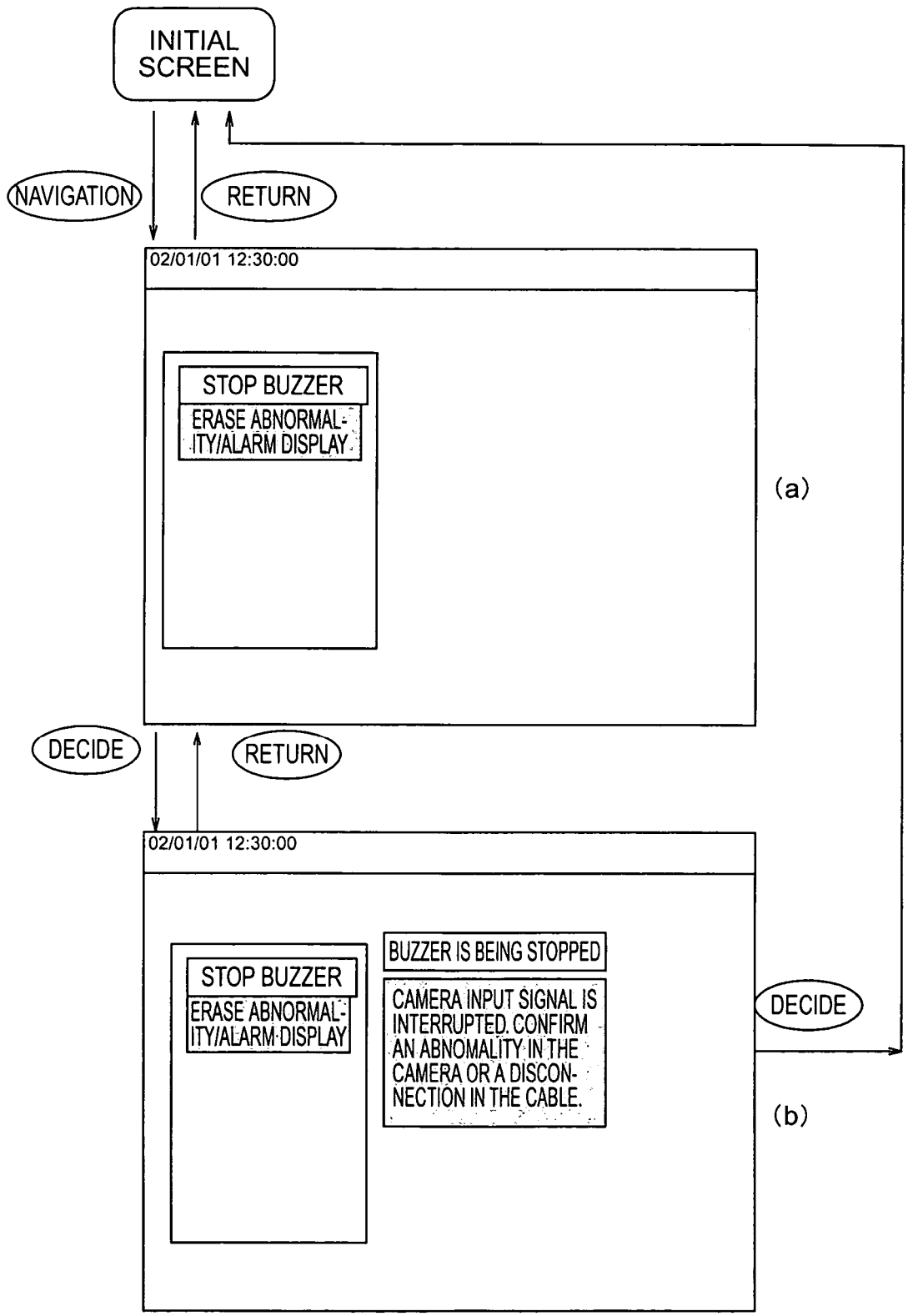
FIG. 7 is an example of the OSD display screen showing a method for coping with an internal abnormality when the abnormality takes place in the security navigation mounted apparatus of the embodiment of the present invention.

When the administrator now pushes the security-navi button 121, such a screen as shown in FIG. 7(*a*) appears. When the administrator first pushes the decision button 125 to put out the buzzer sound, such a screen as shown in FIG. 7(*b*) appears, informing the administrator of a message of "the buzzer is being stopped" and a message of "Camera input signal is interrupted. Confirm an abnormality in the camera or a disconnection in the cable". On the basis of such messages, the administrator pushes the decision button 125. This causes the buzzer sound to stop.

Figure 8:
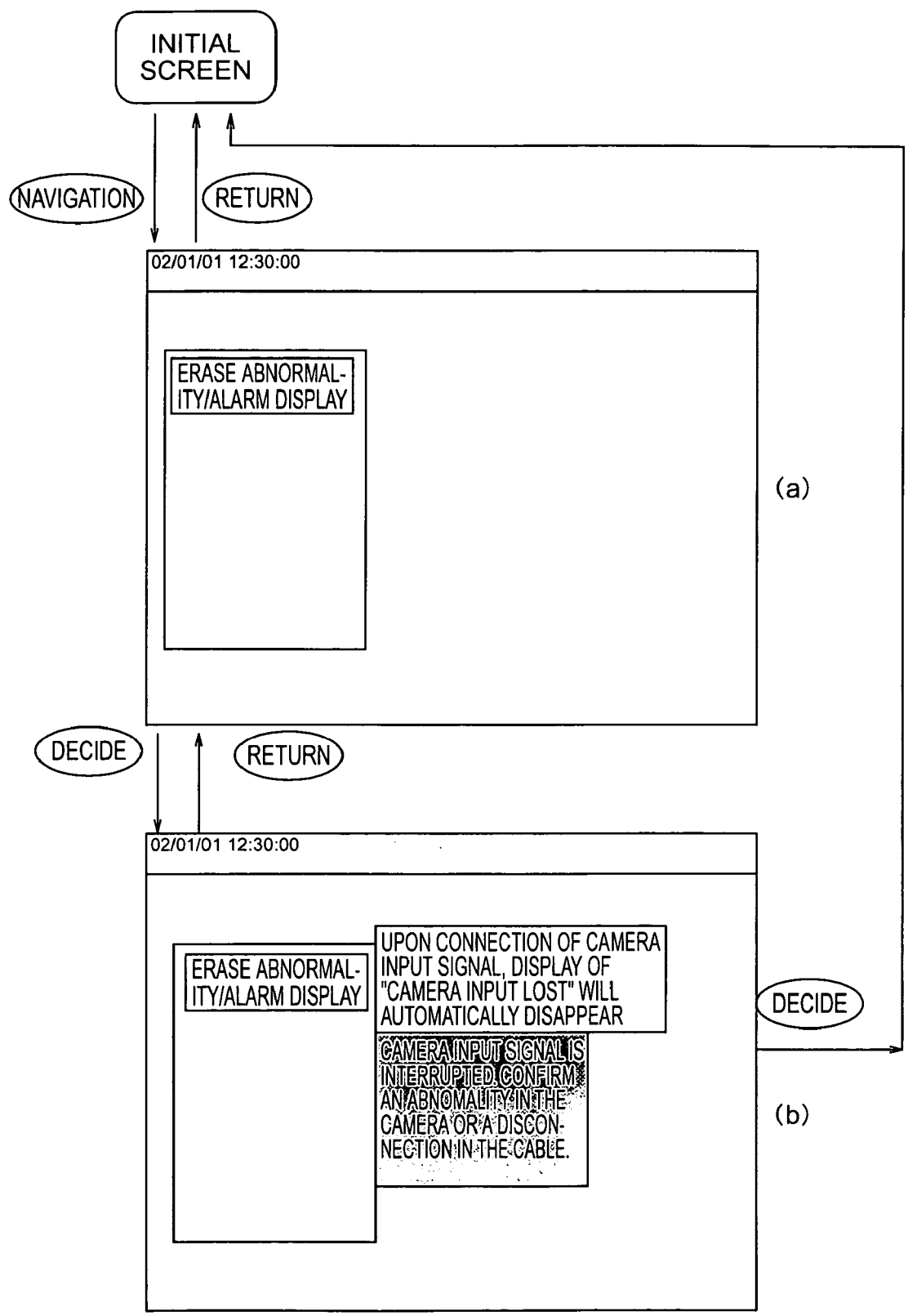
FIG. 8 is another example of the OSD display screen showing a method for coping with an internal abnormality when the abnormality takes place in the security navigation mounted apparatus of the embodiment of the present invention.

Next, pushing the security-navi button 121 to erase the abnormality/alarm display of "camera input lost" causes the screen of FIG. 8(*a*) to appear. Missing of the video signal sent from the camera is a serious abnormality to the monitoring apparatus. Thus, when the administrator pushes the decision button 125, the screen of FIG. 8(*b*) appears, showing a message of "when the camera input signal is connected, the display of 'camera input lost' will automatically disappear".

Explanation will next be made as to the abnormality display when an abnormality is detected in the interior of the monitoring apparatus 100 and as to how to cope with it. When a video signal sent from a camera is recorded in the hard disk recorder 106 built in the monitoring apparatus 100, the signal processing circuit 106-1 converts the video signal to a digital signal suitable for its recording, and the digital signal is recorded in the HDD 106-3 under control of the CPU 106-2.

The amount of video data capable of being recorded in the hard disk recorder (which will be referred to merely as the hard disk, hereinafter) 106 is proportional to the storage capacity of the hard disk 106. Residue information on the storage capacity of the hard disk 106 obtained as the output of the residue detector 106-4 within the hard disk 106 is input to the system microcomputer 101 from time to time. When the system microcomputer 101 recognizes the fact that the residue of the storage capacity of the hard disk 106 became not larger than a constant value (10% or less in this example), the system microcomputer 101 reads out from the memory 107 a program in which operations to be carried out when the residue of the storage capacity of the hard disk 106 became less are recorded, and performs operations explained below.

When the residue information obtained from the hard disk 106 indicates that the capacity residue becomes not larger than 10%, the system microcomputer 101 operates the LED driver circuit 104 to light up the residue LED 104-1 indicating less storage capacity residue, outputs a signal of 'H' level to the HARD DISK FULL control terminal 102-8 of the control terminals 102 to externally warn of the abnormal state by an external alarm device such as the abnormality alarm light 205 connected to the control terminal 102-8; and further outputs a signal to the buzzer driver circuit 105 to drive the buzzer.

Figure 9:
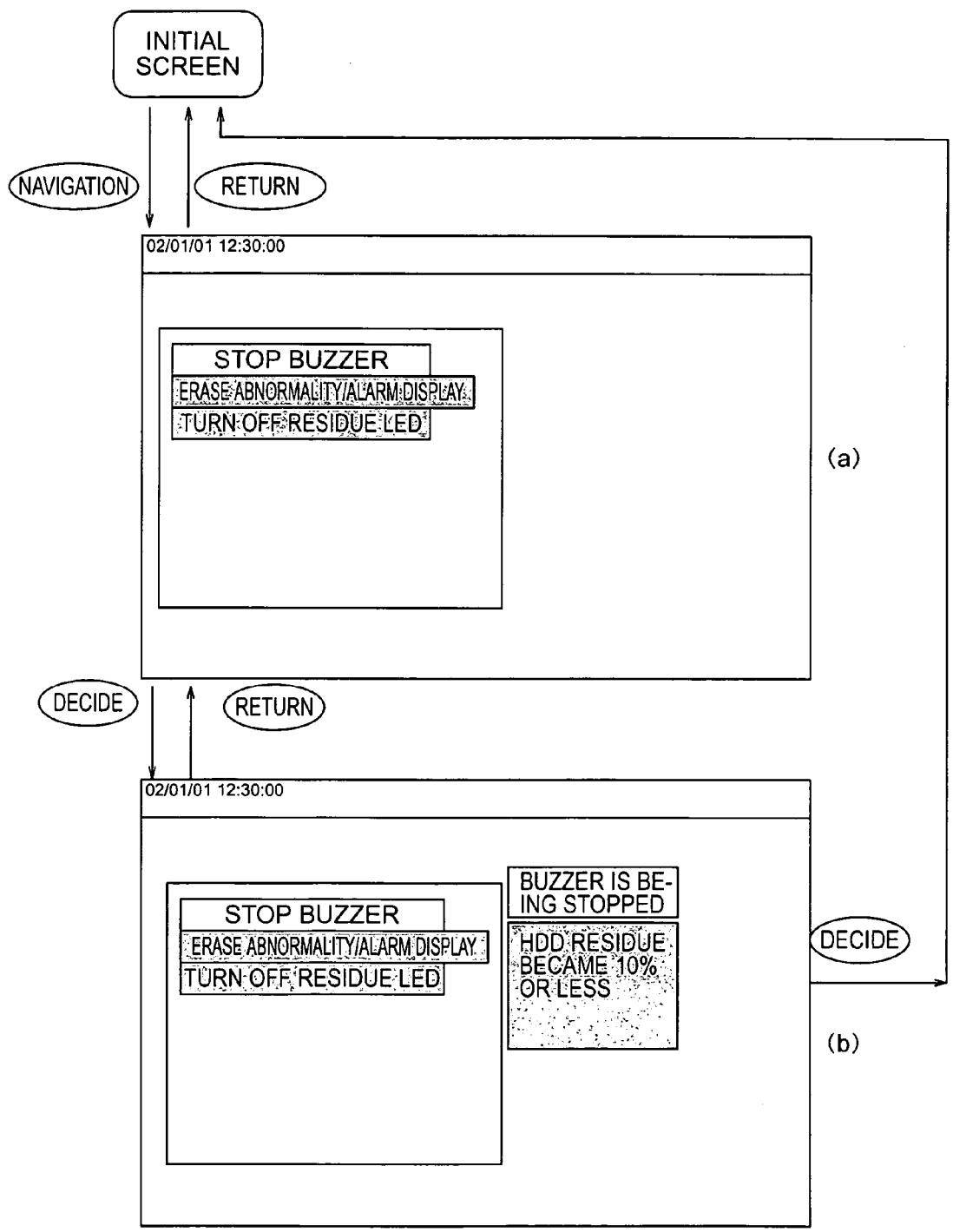
FIG. 9 is an OSD display screen showing a handling method when the security navigation mounted apparatus of the embodiment of the present invention is in its normal state.
Figure 10:
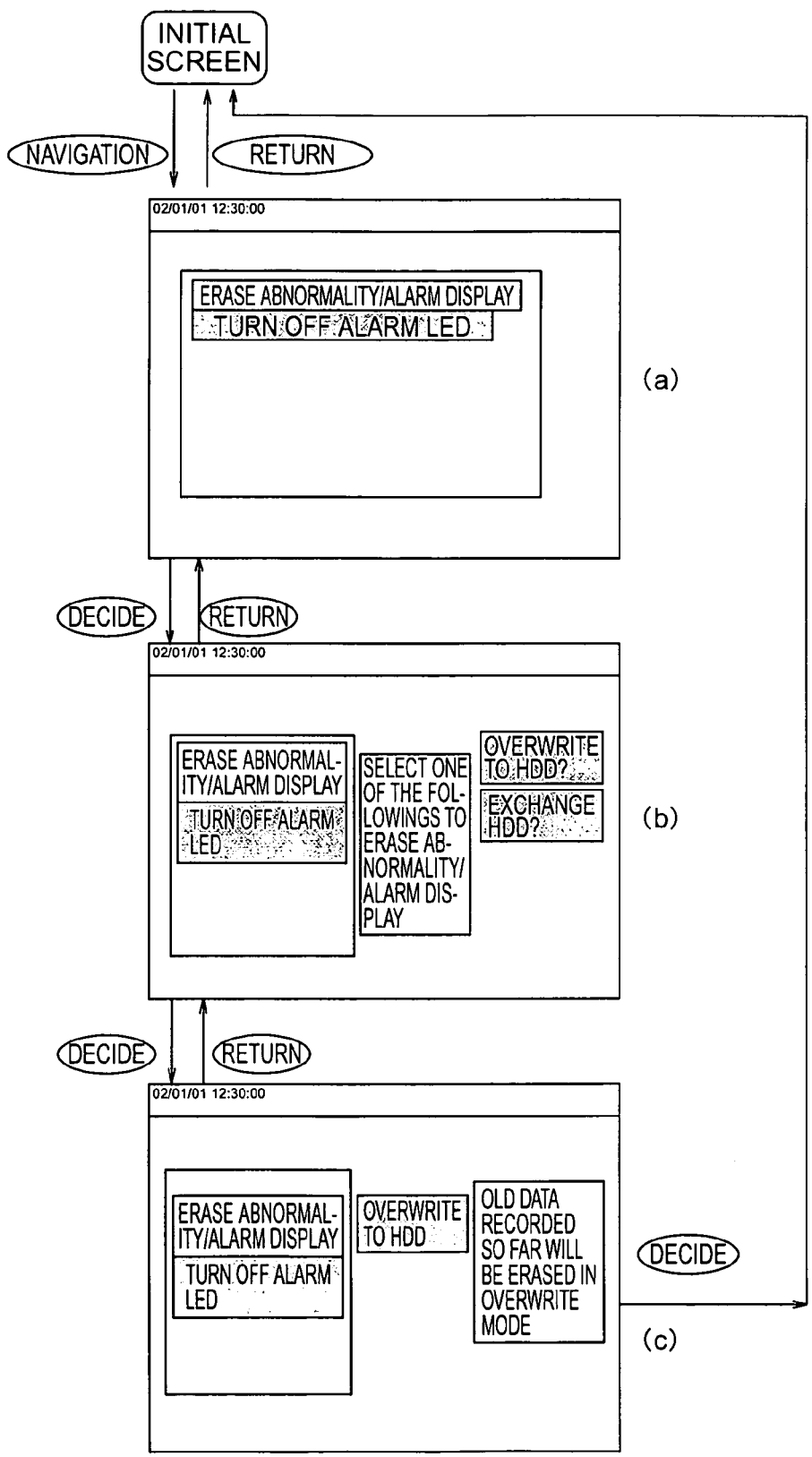
FIG. 10 is another example of the OSD display screen showing a method for coping with an internal abnormality when the abnormality takes place in the security navigation mounted apparatus of the embodiment of the present invention.

When the administrator now pushes the security-navi button 121, such a screen as shown in FIG. 9(*a*) appears. When the administrator first pushes the decision button 125 to put out the buzzer sound, such a screen as shown in FIG. 9(*b*), showing a message of "the residue of the HDD became not larger than 10%" appears to inform the administrator of the cause of the buzzer sounding. When the administrator pushes the decision button 125, the buzzer sound is stopped. When the administrator then pushes the security-navi button 121 to turn off the abnormality alarm light 205, such a screen as shown in FIG. 10(*a*) appears. When the administrator pushes the decision button 125 with the highlighted "erase abnormality alarm display", such a screen as shown in FIG. 10(*b*) appears, showing a message of "select one of the followings to erase abnormality alarm display". Since only erasing of the display results in no change in the residue of the hard disk, specific messages of "overwrite it on HDD?" and "exchange HDD?" appear.

In this case, when the administrator selects the 'overwrite' message and pushes the decision button 125 as shown in FIG. 10(*c*), an alarm of "old data recorded so far will be erased in overwrite mode" appears. When the administrator selects the 'hard disk exchange' message, on the other hand, how to exchange the hard disk is displayed. Through such operations, the monitoring apparatus can suitably cope with the situation even when the residue of the hard disk became less.

The above explanation has been made as to the operation of the method for coping with an abnormal state using the security-navi button 121 when the abnormal state takes place in the external devices or in the monitoring apparatus 100. Explanation will next be directed to how to use the monitoring apparatus when in its normal state.

The PC card memory (which will be referred to merely as the PC card) 206 is a tool for saving video information recorded in the hard disk 106 or reproducing video information saved in another monitoring apparatus. Explanation will be made as to how to save a record from PM 10:00 to PM 11:00 yesterday in the PC card 206, by referring to FIG. 11.

Figure 11:
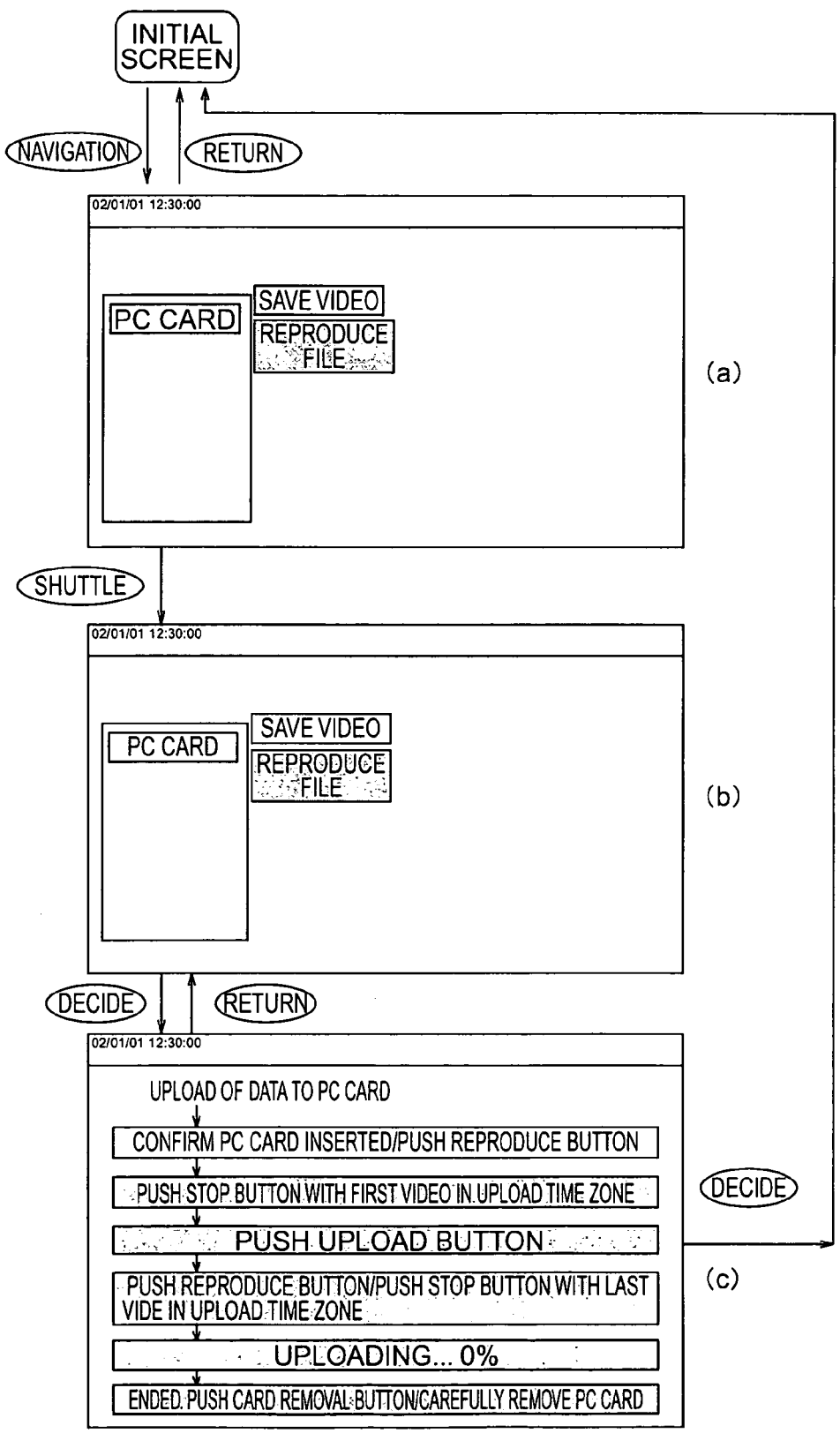
FIG. 11 is a diagram for explaining the recording operation in a PC card memory in the security navigation mounted apparatus of the embodiment of the invention.

When the administrator inserts the PC card 206 in the PC card slot 109 of the monitoring apparatus 100, the PC card sensor 109-1 is operated and the system microcomputer 101 recognizes the fact that the PC card 206 was loaded. When the administrator then pushes the security-navi button 121, such a screen as shown in FIG. 11(*a*) appears, showing two choice messages of "save the video" and "reproduce the file". When the administrator selects the message of "save the video" by using the shuttle ring 123 on a screen of FIG. 11(*b*) and pushes the decision button 125, such a screen as shown in FIG. 11(*c*) appears, showing an upload procedure of saving the video signal in the PC card 206. The administrator conducts operations according to the displayed items.

More specifically, since a message of "confirm PC card inserted and then push reproduce button" first appears on the TV 201, the administrator pushes the reproduce button 122. Next, according to a message of "push stop button with the first video in a time zone which you wants to upload", the administrator pushes a stop button 127 with PM 10:00 yesterday. According to a message of "push upload button", the administrator then pushes an upload button 128. According to a message of "push reproduce button and then push stop button with the last video in the time zone which you wants to upload", the administrator pushes the reproduce button 127 at PM 11:00. A message of "uploading . . . 0%" is displayed and 0% in the message gradually counts up to 100%, at which time the message is changed to a message of "Completed. Push PC card removal button and carefully remove PC card". At this time, the administrator removes the PC card. In this manner, video information recorded in the hard disk 106 can be saved in the PC card 206.

Figure 12:
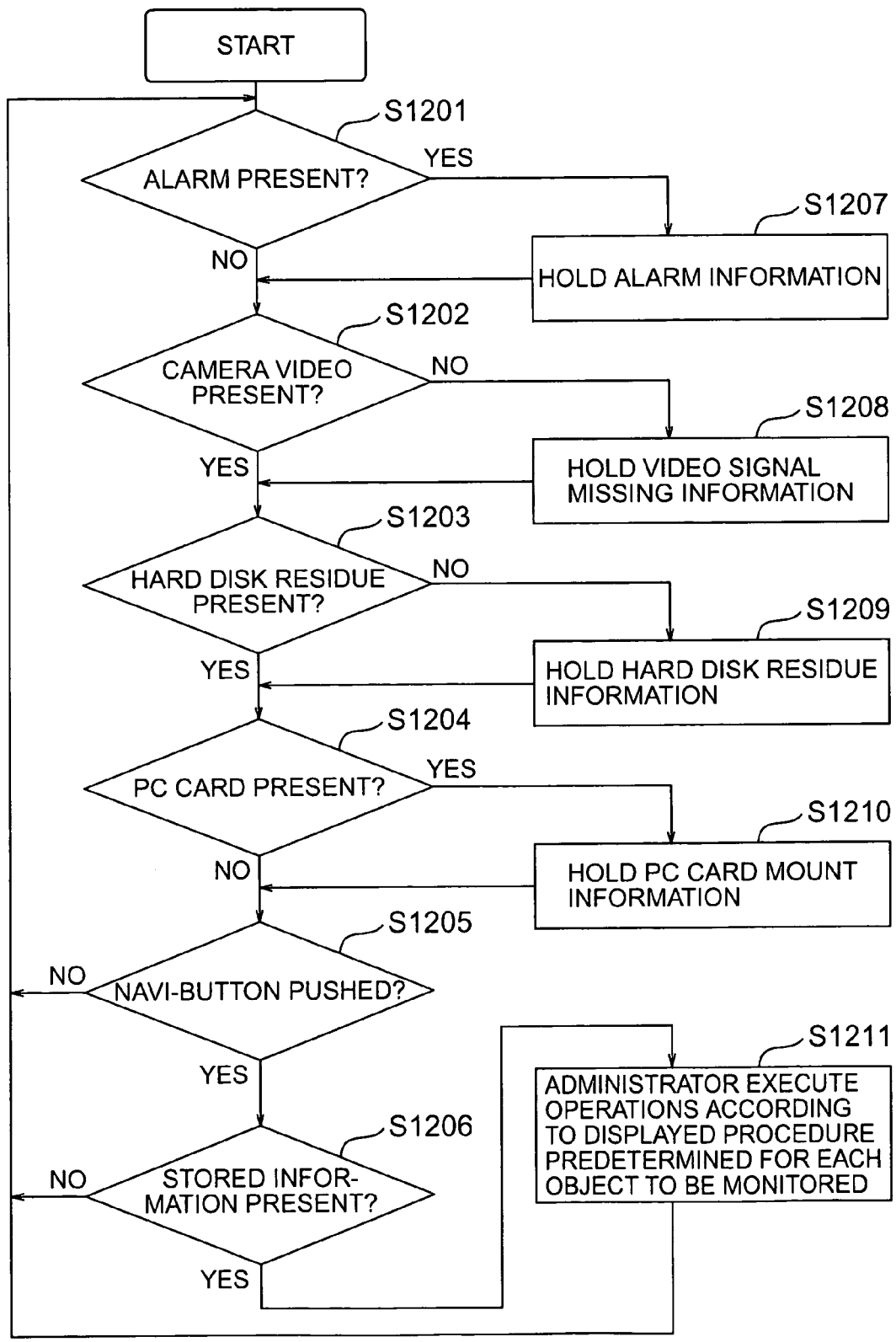
FIG. 12 is another flow chart of operations of the microcomputer in the security navigation mounted apparatus of the embodiment of the invention.

Explanation has been made in connection with the cases of the abnormal case that, when an alarm signal is input from the door sensor, the video signal is not sent from the camera, and the abnormal case that the residue of the hard disk 106 becomes less, or in connection with how to cope with it when the administrator pushes the security-navi button 121 during loading of the PC card. Explanation will next be directed to how the system microcomputer 101 reads monitor information for each of the aforementioned events to be monitored, by referring to a flow chart of FIG. 12.

The system microcomputer 101 repetitively monitors various sorts of monitor information in a short period, for example, in a period of 10 msec. in the illustrated case, and hold its result in the memory 107. In a step S1201, the microcomputer judges the presence or absence of an alarm signal sent from the door sensors. In the presence of the alarm signal input, the microcomputer acquires alarm information and holds it in the memory 107 (step S1207). The alarm signal is individually judged as one of the alarm signals from the alarm 1 signal to the alarm 4 signal and held in the memory 107. And control then moves to the next step. In the absence of the alarm signal, on the other hand, the microcomputer immediately judges a video signal for the next camera (step S1202), that is, judges the presence or absence of a video signal of each camera sent to the camera driver circuit 108.

In the absence of the video signal, the microcomputer acquires a video signal missing information indicative of the camera the video signal of which is missing, holds the information in the memory 107 (step S1208), and goes to the next step. In the presence of the video signal, the microcomputer immediately goes to a step S1203 to judge a residue in the capacity of the hard disk 106. The microcomputer judges whether or not an enough residue in the storage capacity of the hard disk 106 remains. In the absence of the enough residue, the microcomputer acquires residue information on the hard disk 106 (step S1209), holds the information in the memory 107, and then proceeds to the next step. In the presence of the enough residue in the hard disk 106, the microcomputer immediately judges the presence or absence of the PC card mounted (step S1204). When the PC card is mounted, the microcomputer acquires the PC card mount information (step S1210), holds the information in the memory 107, and then goes to the next step.

When the PC card is not mounted, on the other hand, the microcomputer immediately goes to a next step of judging the presence or absence of the pushing or input of the security-navi button 121 (step S1205). When detecting the pushing of the security-navi button 121 and judging the presence of the input of the security-navi button, the microcomputer displays corresponding procedures previously determined for the respective objects to be monitored as shown in FIGS. 3 to 11. That is, following the displayed procedures, the administrator carries out corresponding operations (step S1211). When the corresponding operation has been carried out, information about the object to be monitored held in the memory 107 and subjected to the corresponding operation is erased. In the absence of the input of the security-navi button 121, on the other hand, the microcomputer returns to the top step S1201 to continue the monitoring operation.

As has been mentioned above, in accordance with the present invention, when the abnormality detecting means detects an abnormality in the objects to be monitored and when the buzzer or the like informs the administrator of the abnormality, the administrator's pushing of the security-navi button of the monitoring apparatus causes information about the current abnormal state as well as information about how to cope with the abnormal state to be immediately displayed on the OSD. In response to it, when the administrator operates the monitoring apparatus according to the displayed menu, the administrator can quickly cope with the abnormal state.

In accordance with the present invention, when an abnormal state take place, the administrator can quickly cope with the abnormal state with good handleability.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A monitoring apparatus for monitoring monitor information sent from an object to be monitored, comprising:
   means for operating said monitoring apparatus;
   means for detecting an abnormality in the monitor information sent from said object to be monitored;
   means for notifying of the abnormality in the object to be monitored detected by said abnormality detecting means; and
   means for displaying associated information about said detected monitor information of the object to be monitored when said operating means is operated after notification of said notifying means.

2. The monitoring apparatus as set forth in claim 1, further comprising means for previously storing the associated information of said monitor information.

3. The monitoring apparatus as set forth in claim 1, further comprising means for selecting the associated information displayed on said display means, and wherein said associated information includes an item for stopping the notification of said notifying means.

4. The monitoring apparatus as set forth in claim 3, wherein selection of the item for stopping the notification by said selection means causes stoppage of the notification, and information about a reason of the notification and information about a coping method therefor are displayed on said display means.

5. The monitoring apparatus as set forth in claim 1, wherein, a plurality of said object to be monitored are present, said plural objects to be monitored are present inside and outside of said monitoring apparatus, and the objects to be monitored present inside of the monitoring apparatus are states of respective units in said monitoring apparatus.

6. The monitoring apparatus as set forth in claim 1, wherein the monitor information sent from said objects to be monitored includes identification information indicative of specific one of the objects to be monitored.

7. The monitoring apparatus as set forth in claim 1, wherein the abnormality in the monitor information sent from said objects to be monitored includes a fault in the objects to be monitored.

8. The monitoring apparatus as set forth in claim 1, wherein the monitor information sent from said objects to be monitored is a video signal.

9. A monitoring apparatus for monitoring monitor information sent from a plurality of external devices, comprising:
   means for operating said monitoring apparatus;
   means for detecting an abnormality in the monitor information sent from said plurality of external devices; and
   means for notifying of the abnormality in the monitor information detected by said abnormality detecting means,
   wherein the operation of said operating means after the notification of said notifying means causes stoppage of the notification.

10. A monitoring apparatus for monitoring monitor information, comprising:
    means for operating said monitoring apparatus;
    means for detecting an abnormality or fault in states of units inside of said monitoring apparatus;
    means for notifying the abnormality or fault in the states of the internal units of said monitoring apparatus detected by said abnormality detecting means; and
    means for displaying associated information about said abnormality or fault when said operating means is operated after the notification of said notifying means.

* * * * *